(12) United States Patent
Williams

(10) Patent No.: US 9,438,114 B2
(45) Date of Patent: Sep. 6, 2016

(54) METHODS AND SYSTEMS FOR ENERGY RECYCLING

(71) Applicant: Warren Allen Williams, Ballwin, MO (US)

(72) Inventor: Warren Allen Williams, Ballwin, MO (US)

(*) Notice: Subject to any disclaimer, the term of this patent is extended or adjusted under 35 U.S.C. 154(b) by 456 days.

(21) Appl. No.: 14/037,980

(22) Filed: Sep. 26, 2013

(65) Prior Publication Data

US 2015/0084425 A1    Mar. 26, 2015

(51) Int. Cl.
*H02J 1/00* (2006.01)
*H02M 3/158* (2006.01)
*H02M 1/00* (2006.01)
*H02M 3/155* (2006.01)

(52) U.S. Cl.
CPC ..... *H02M 3/158* (2013.01); *H02M 2001/0048* (2013.01); *H02M 2003/1555* (2013.01); *Y02B 70/1425* (2013.01); *Y02B 70/1491* (2013.01); *Y10T 307/696* (2015.04); *Y10T 307/74* (2015.04)

(58) Field of Classification Search
CPC ............ H02M 3/159; H02M 2001/0048; H02M 2003/1555; Y02B 70/1425; Y02B 70/1491; Y10T 307/696; Y10T 307/74

USPC .......................................................... 307/80
See application file for complete search history.

(56) References Cited

U.S. PATENT DOCUMENTS

| | | | | |
|---|---|---|---|---|
| 4,427,931 A | * | 1/1984 | Tsukihashi | H02P 7/2906 388/815 |
| 2003/0001532 A1 | * | 1/2003 | DaSilva | H02P 8/32 318/432 |
| 2005/0189819 A1 | * | 9/2005 | Maskatia | H02J 7/0013 307/86 |
| 2013/0076330 A1 | * | 3/2013 | Hayashi | H02M 3/156 323/311 |

* cited by examiner

*Primary Examiner* — Rexford Barnie
*Assistant Examiner* — Toan Vu
(74) *Attorney, Agent, or Firm* — Armstrong Teasdale LLP

(57) ABSTRACT

Methods and systems for energy recycling are described. One example energy recycler includes an input to receive an input voltage, an output to couple to an inductor, a resonant tank, a switching circuit coupled between the input, the output, and the resonant tank, and a controller coupled to the switching circuit. The controller is configured to control the switching circuit to selectively couple the input voltage to the output, and couple an induced voltage from the inductor to the resonant tank when the input voltage is decoupled from the inductor.

15 Claims, 16 Drawing Sheets

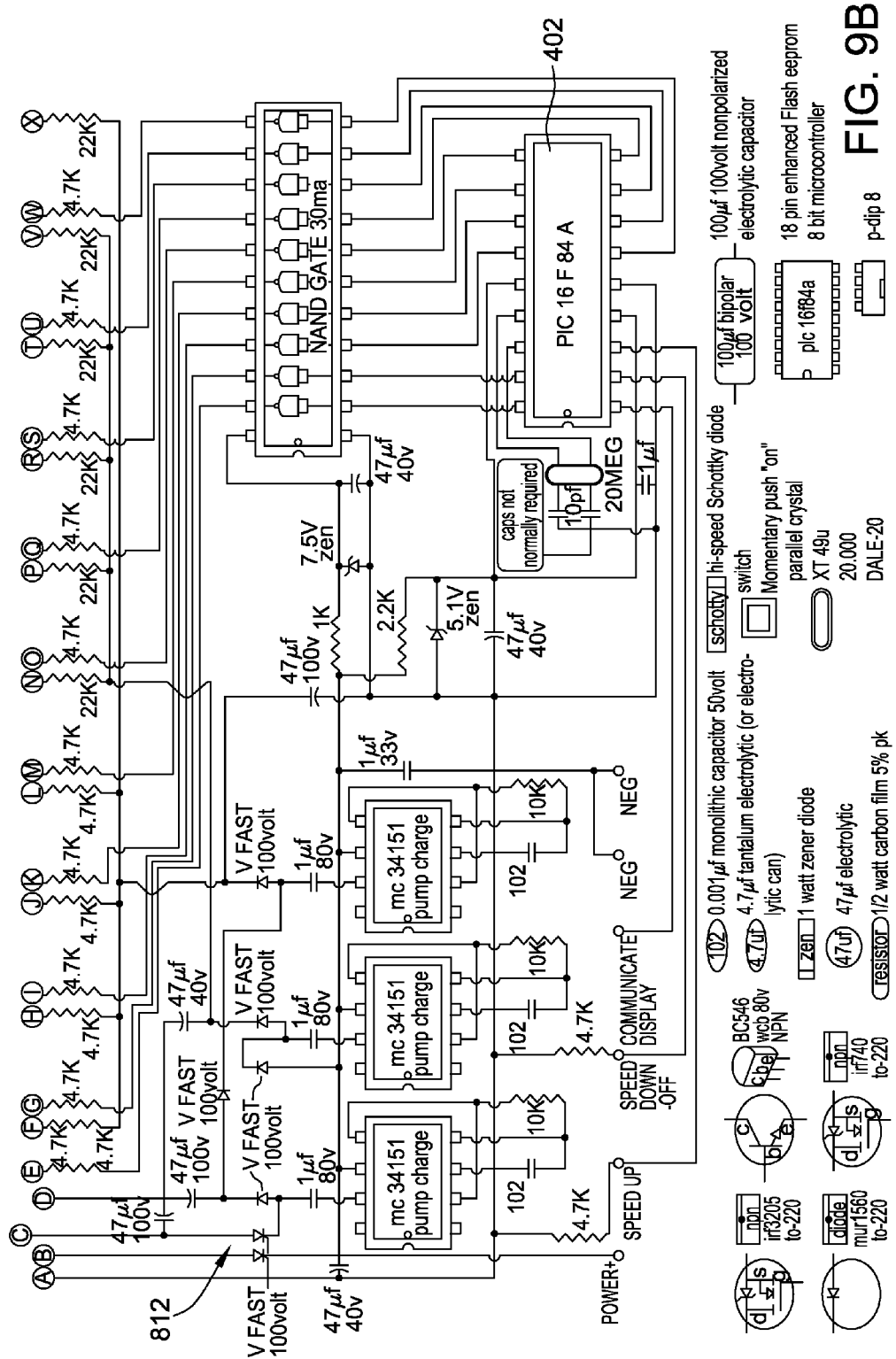

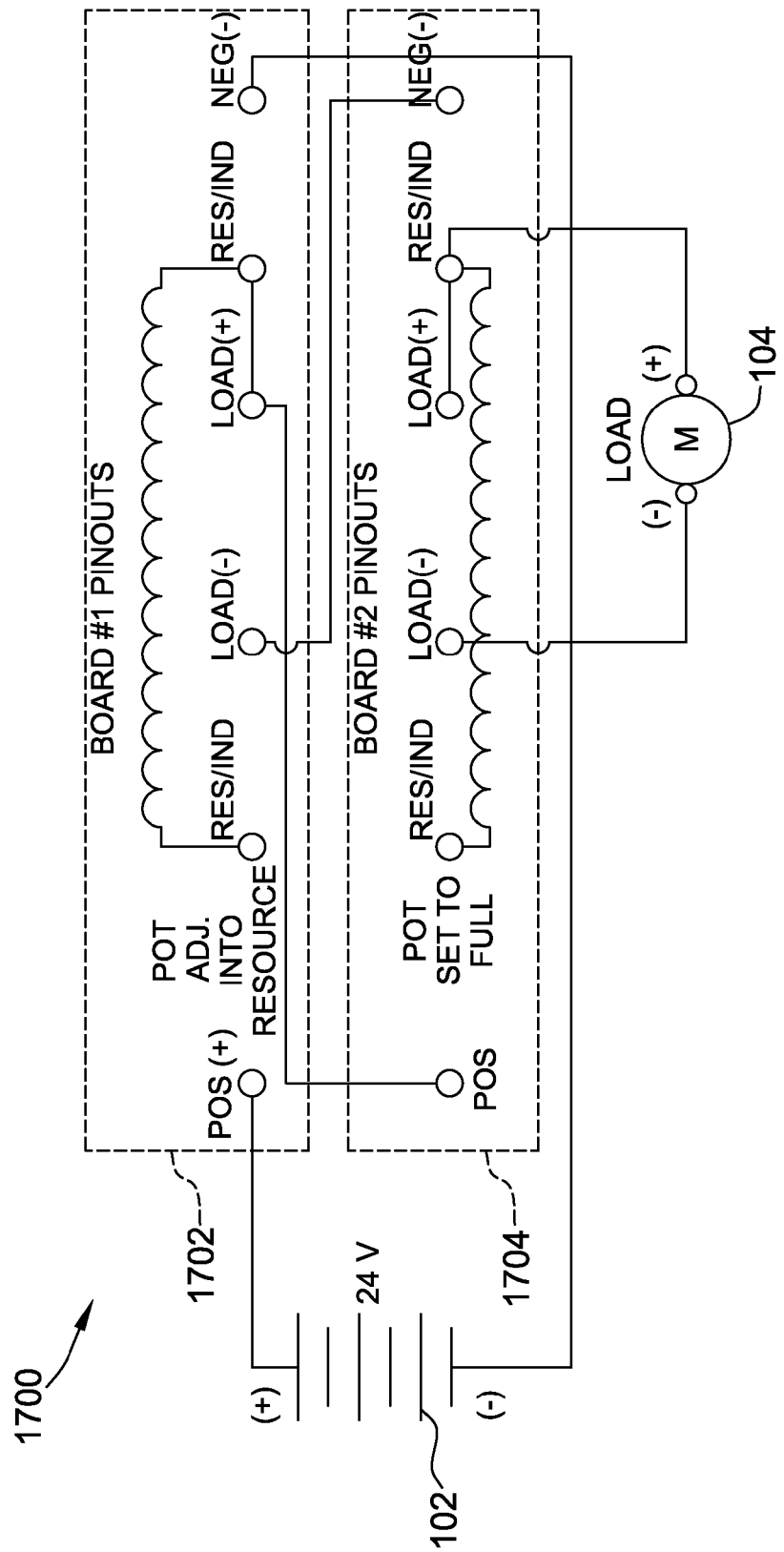

METHODS AND SYSTEMS FOR ENERGY RECYCLING

BACKGROUND

The present application relates generally to electrical energy and, more particularly, to methods and systems for energy recycling.

Electrically powered devices typically include one or more components that increase losses of electrical energy. For example, when a direct current (DC) voltage is applied to an inductive load (such as a coil, inductor, transformer, etc.), the current through the inductive load produces a magnetic field that stores energy. When the DC voltage is removed from the inductive load, the magnetic field collapses and a voltage of opposite polarity is generated on the inductive load. The generated voltage spike may have the potential to damage components of an electric circuit. Various protective schemes (e.g., snubbing diodes) are used to limit the voltage spike and slowly dissipate the energy stored in the inductive loads magnetic field. The dissipated energy typically performs no useful work and contributes to energy loss and system inefficiency.

BRIEF DESCRIPTION

In one aspect, an energy recycler includes an input to receive an input voltage, an output to couple to an inductor, a resonant tank, a switching circuit coupled between the input, the output, and the resonant tank, and a controller coupled to the switching circuit. The controller is configured to control the switching circuit to selectively couple the input voltage to the output, and couple an induced voltage from the inductor to the resonant tank when the input voltage is decoupled from the inductor.

In another aspect, a system includes an electrical source to provide an input voltage, a load, and an energy recycler coupled between the electrical source and the load. The energy recycler includes an input coupled to the electrical source to receive the input voltage, an output coupled to the load, a resonant tank, a switching circuit coupled between the input, the output, and the resonant tank, and a controller coupled to the switching circuit. The controller is configured to control the switching circuit to selectively couple the input voltage to an inductor, and couple an induced voltage from the inductor to the resonant tank when the input voltage is decoupled from the inductor.

BRIEF DESCRIPTION OF THE DRAWINGS

FIGS. 9A and 9B are a circuit diagram of another energy recycler for use in the system shown in FIG. 6.

FIG. 17 is a simplified diagram of a system including two stacked energy recyclers.

DETAILED DESCRIPTION

Exemplary embodiments of methods and systems for energy recycling are described herein. The exemplary systems collect energy from the collapsing magnetic field of an inductive load. The collected energy may be used, for example to charge a battery, supplement power from another power source, or directly power a load.

Figure 1:
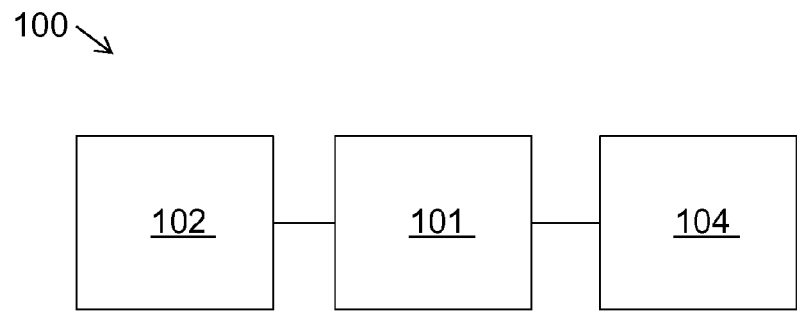
FIG. 1 is a schematic block diagram of an exemplary system including an energy recycler.

FIG. 1 is a schematic block diagram of an exemplary system 100. System 100 includes an energy recycler 101, an electric source 102, and a load 104. Electric source 102 may be any suitably direct current (DC) electric source including, for example, a battery, a rectifier alternating current (AC) source, a photovoltaic panel, a generator, etc. Although only one source 102 is shown, system 100 may include more than one source 102 of the same or different type. Electric source 102 provides power to load 104 through an energy recycler 101. Energy recycler 101 captures energy (sometimes referred to herein as back EMF) from a collapsing magnetic field around an inductor (not shown in FIG. 1). Energy recycler 101 may sometimes be referred to as a battery enhancement control system, or a power manager. Energy recycler 101 stores the captured energy. In an example embodiment, energy recycler 101 uses the stored energy to charge a battery, which may be source 102 or which may be used to supplement power from source 102. Alternatively, energy recycler 101 uses the stored energy to directly power load 104, thereby reducing the amount of power needed from source 102.

Figure 2:
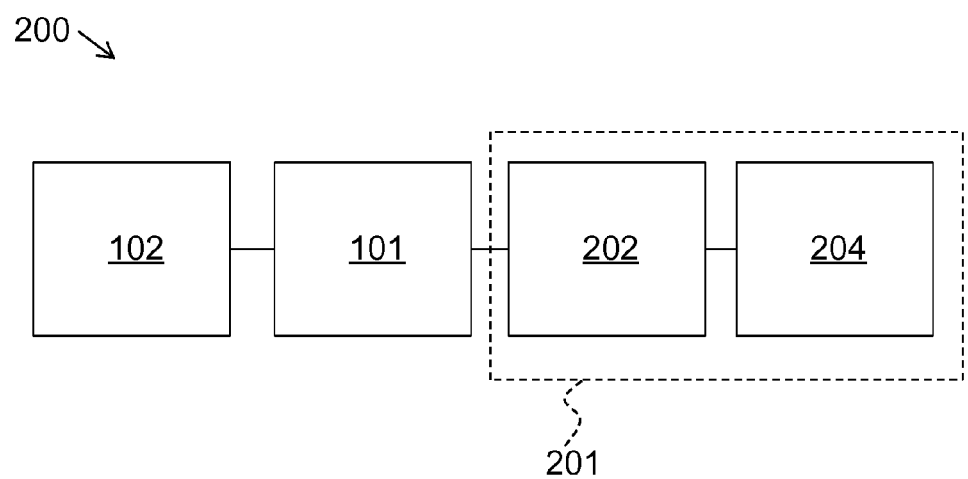
FIG. 2 is a schematic block diagram of an exemplary system including an energy recycler and a motor load.
Figure 3:
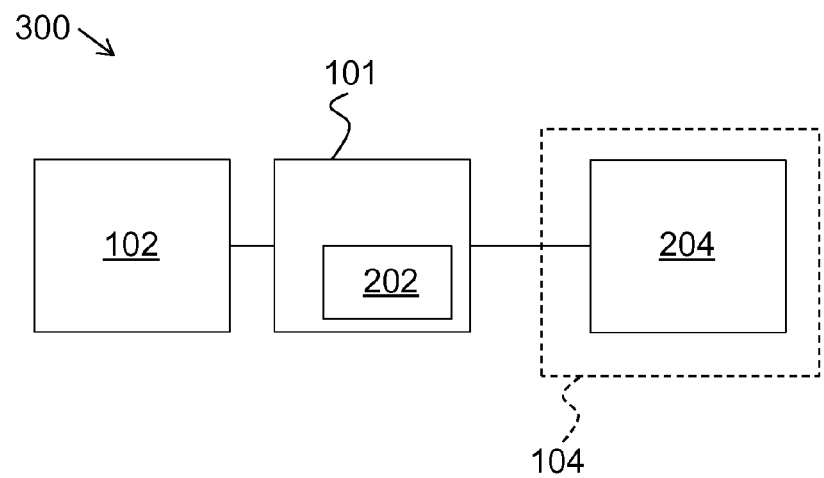
FIG. 3 is a schematic block diagram of another exemplary system including an energy recycler and a motor load.

FIG. 2 is a schematic block diagram of an exemplary system 200 including electric source 102, a load 201, and energy recycler 101. In system 200, load 201 is a motor assembly. The motor assembly includes a motor controller 202 and an electric motor 204. Motor 204 may be any suitable electric motor. Motor controller 202 controls application of power from source 102 to motor 204 to produce the desired operation of motor 204. Motor controller 202 applies pulses of DC power from source 102 to one or more windings (not shown) of motor 204. The windings of motor 204 are inductive coils. Energy recycler 101 captures energy from the collapsing magnetic field around the windings at the end of each pulse of power to the windings. FIG. 3 is a schematic block diagram of another exemplary system 300 including electric source 102, load 104, and an energy recycler 301. Except as otherwise described herein, energy recycler 301 is substantially identical to energy recycler 101 and functions in substantially the same manner. In system 300, load 104 is a motor assembly including motor 204. Motor controller 202 is part of energy recycler 301 rather than part of the motor assembly.

Figure 4:
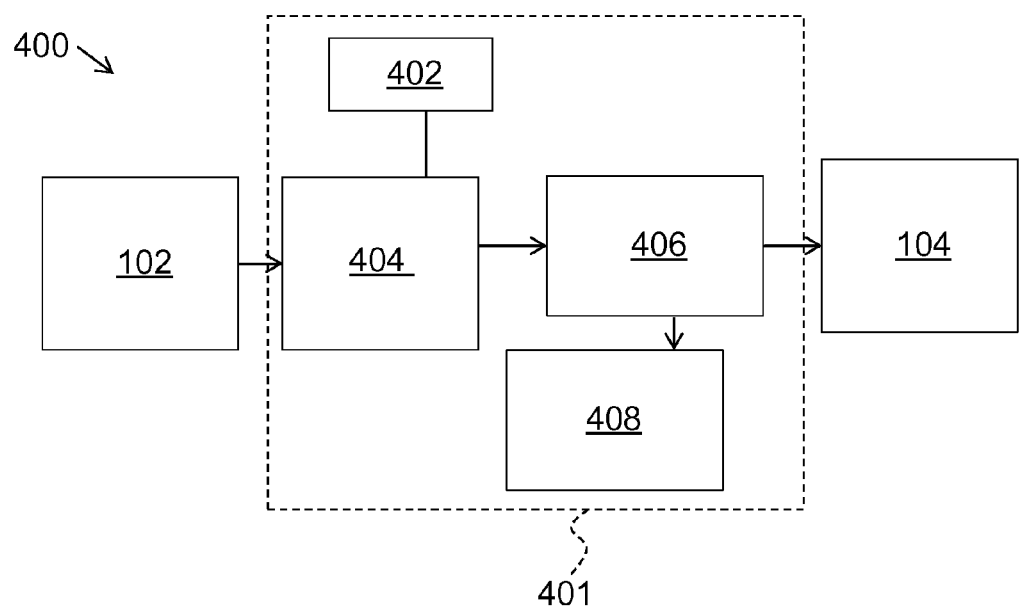
FIG. 4 is a schematic block diagram of an exemplary system including an energy recycler.

FIG. 4 is a schematic block diagram of an exemplary system 400 including electric source 102, load 104, and an energy recycler 401. Except as otherwise described herein, energy recycler 401 is substantially identical to energy recycler 101 and functions in substantially the same manner. Energy recycler 401 includes a controller 402, switching circuitry 404, an inductor 406, and a resonant tank 408. Controller 402 controls operation of switching circuitry 404 to selectively apply power from source 102 to load 104 through inductor 406. Controller 402 may include analog and/or digital control circuitry. In some embodiments, controller 402 includes at least one processor. It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. As used herein, an analog controller does not include a processor as described above. In the exemplary embodiment, switching circuitry 404 includes a plurality of metal-oxide-semiconductor field-effect transistors (MOSFETs). Alternatively, the switches may be bipolar junction transistor (BJTs), junction field-effect transistors (JFETs), or any other suitable electrically controllable switch. Controller 402 operates switching circuitry 404 to apply power through inductor 406 to load 104 as a series of pulses. At the end of each pulse of power the collapsing magnetic field around the inductor 406 induces a voltage of opposite polarity on the inductor 406. This voltage is coupled to the resonant tank 408 for storage of the energy associated with the induced voltage for later use. In an example embodiment, resonant tank 408 includes a capacitor coupled in parallel with an inductor. The inductor may be an air core inductor, an iron core inductor, or any other suitable inductor. In some embodiments, resonant tank may also include one or more resistors. Alternatively, resonant tank may be any other suitable resonant tank capable of capturing and storing energy as described herein.

Figure 5:
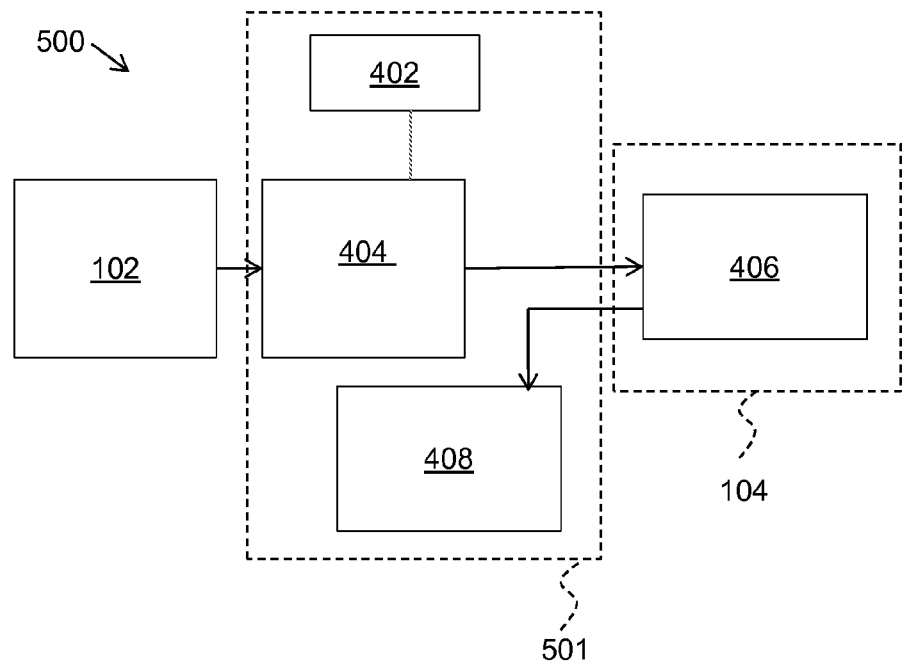
FIG. 5 is a schematic block diagram of another exemplary system including an energy recycler.

FIG. 5 is a schematic block diagram of an exemplary system 500 including electric source 102, load 104, and energy recycler 501. Except as otherwise described herein, energy recycler 501 is substantially identical to energy recycler 401 and functions in substantially the same manner. In energy recycler 501, inductor 406 is part of load 104, and energy recycler 501 includes controller 402, switching circuitry 404, and resonant tank 408. In an exemplary embodiment, load 104 is an electric motor and inductor 406 is one or more windings of the motor. Alternatively, inductor 406 may be any other suitable inductive component of load 104. Controller 402 controls operation of switching circuitry 404 to selectively apply power from source 102 to inductor 406 as a series of pulses. The induced voltage across the inductor 406 at the end of each pulse of power is coupled to the resonant tank 408 for storage of the energy associated with the induced voltage for later use.

Figure 6:
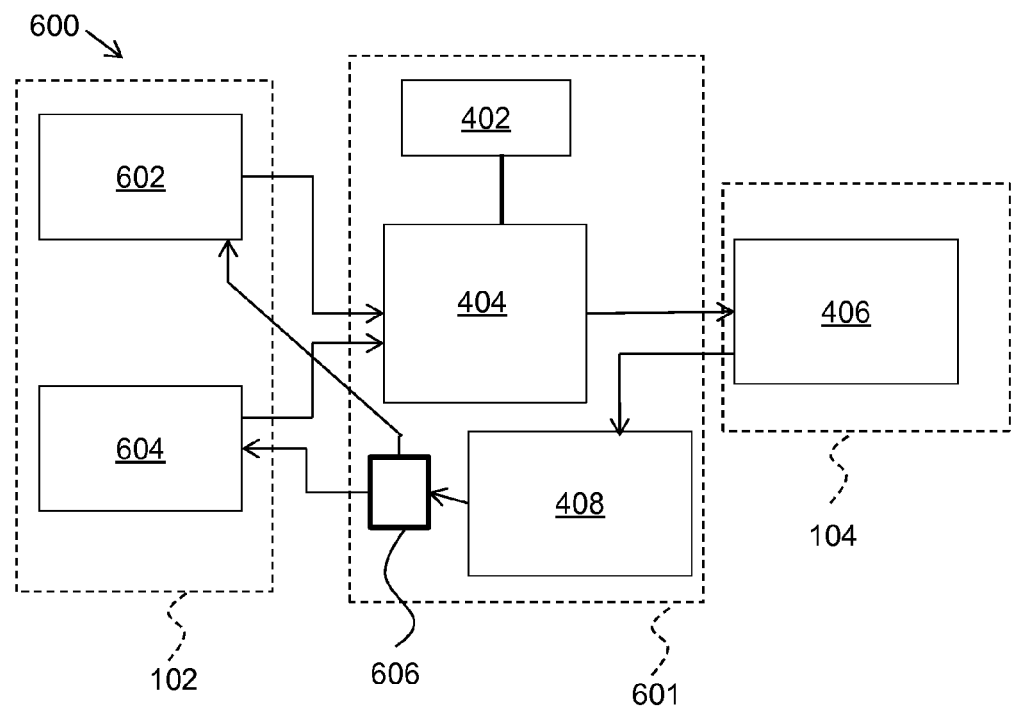
FIG. 6 is a schematic block diagram of an exemplary system including two batteries and an energy recycler used to recharge the batteries.

FIG. 6 is a schematic block diagram of an exemplary system 600 including electric source 102, load 104, and an energy recycler 601. Except as noted, system 600 is identical to system 500, and energy recycler 601 is substantially identical to energy recycler 501 and functions in substantially the same manner. In system 600, electric source 102 includes two batteries 602 and 604. Controller 402 controls operation of switching circuitry 404 to selectively apply power from batteries 602 and 604 to inductor 406 as a series of pulses. More specifically, controller selectively applies power from one battery 602 or 604 at a time. When battery 602 is supplying power, battery 604 is not supplying power and vice versa. The energy stored in resonant tank 408 is used to charge the battery 602 or 604 from which controller 402 is not applying power to the load 104. Thus, when battery 602 is powering load 104, battery 604 is being charged from the energy stored in tank 408. Similarly, when battery 604 is powering load 104, battery 602 is being charged from the energy stored in tank 408. Switching circuitry 606 selectively couples tank 408 to battery 602 or 604. In an exemplary embodiment, switching circuitry 606 is controlled by controller 402. Alternatively, switching circuitry 606 is controlled by its own controller, is self-regulated, or is controlled by any other suitable controller. In some embodiments, switching circuitry 606 is part of switching circuitry 404.

Figure 7:
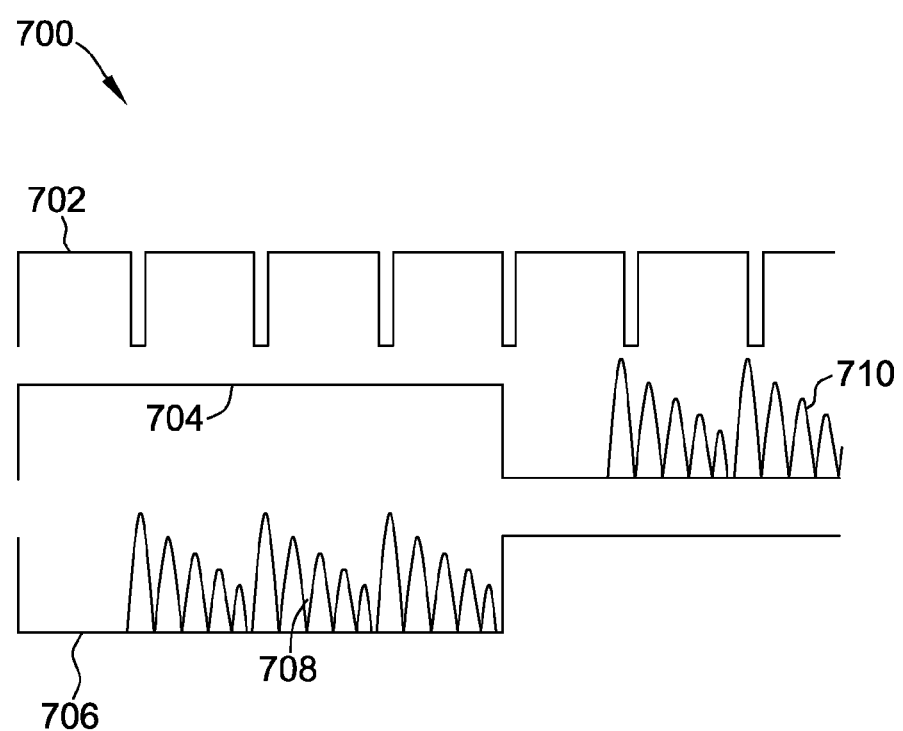
FIG. 7 is a graph of simulated voltages from operation of the system shown in FIG. 6.

FIG. 7 is a graphical representation 700 of operation of embodiments of an energy recycler, such as energy recycler 601, used in two battery systems, such as system 600. Trace 702 are the pulses applied by controller 402 to load 104 (and accordingly to the inductor 406). Trace 704 is the energy delivered by battery 602 and trace 706 is the energy delivered by battery 604. Trace 708 is the back EMF collected by energy recycler 601 and provided to battery 604 when battery 604 is not providing power for the pulses 702. Trace 710 is the back EMF collected by energy recycler 601 and provided to battery 602 when battery 602 is not providing power for the pulses 702.

Figure 8A:
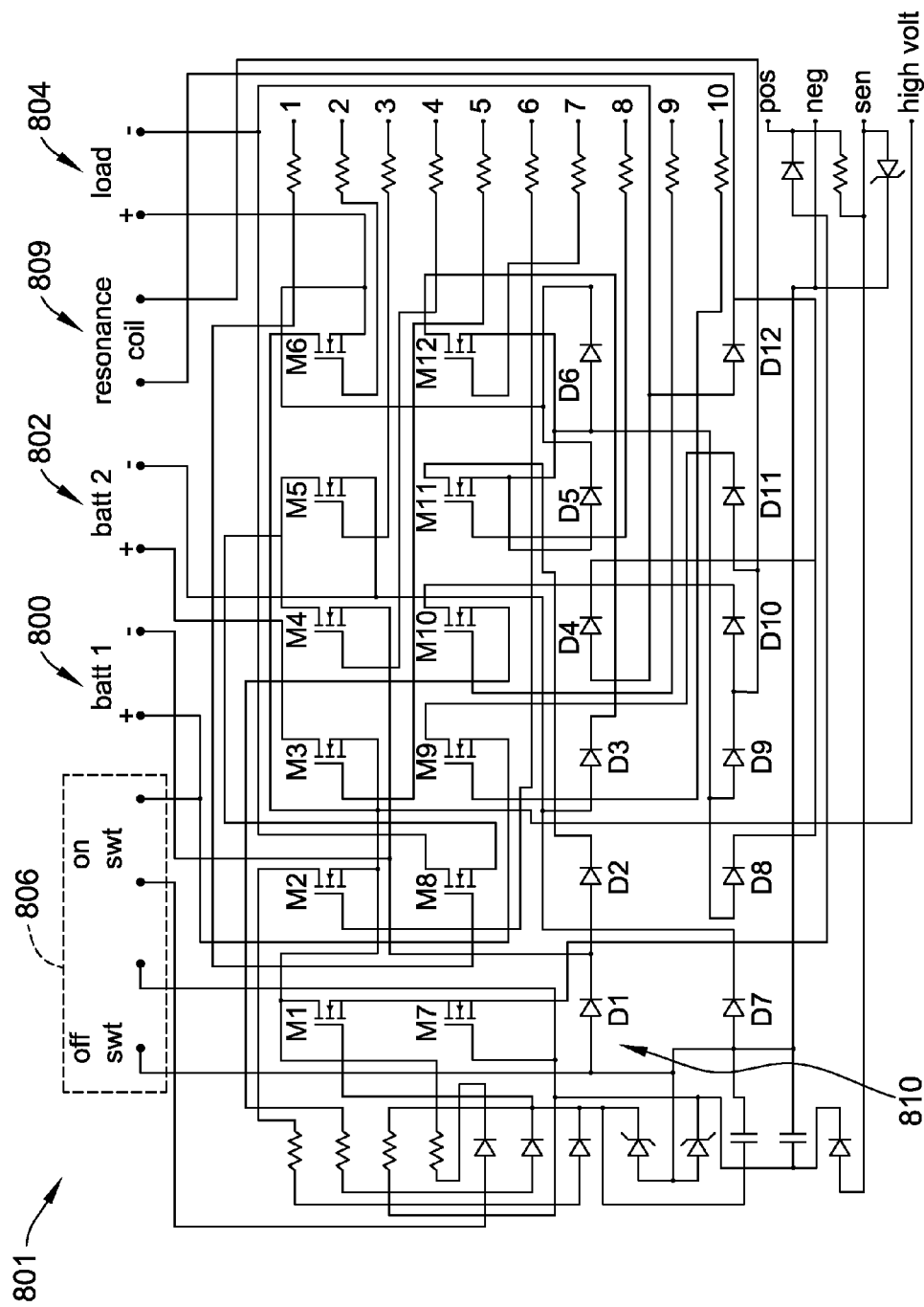
FIGS. 8A and 8B are a circuit diagram of an energy recycler for use in the system shown in FIG. 6.
Figure 8B:
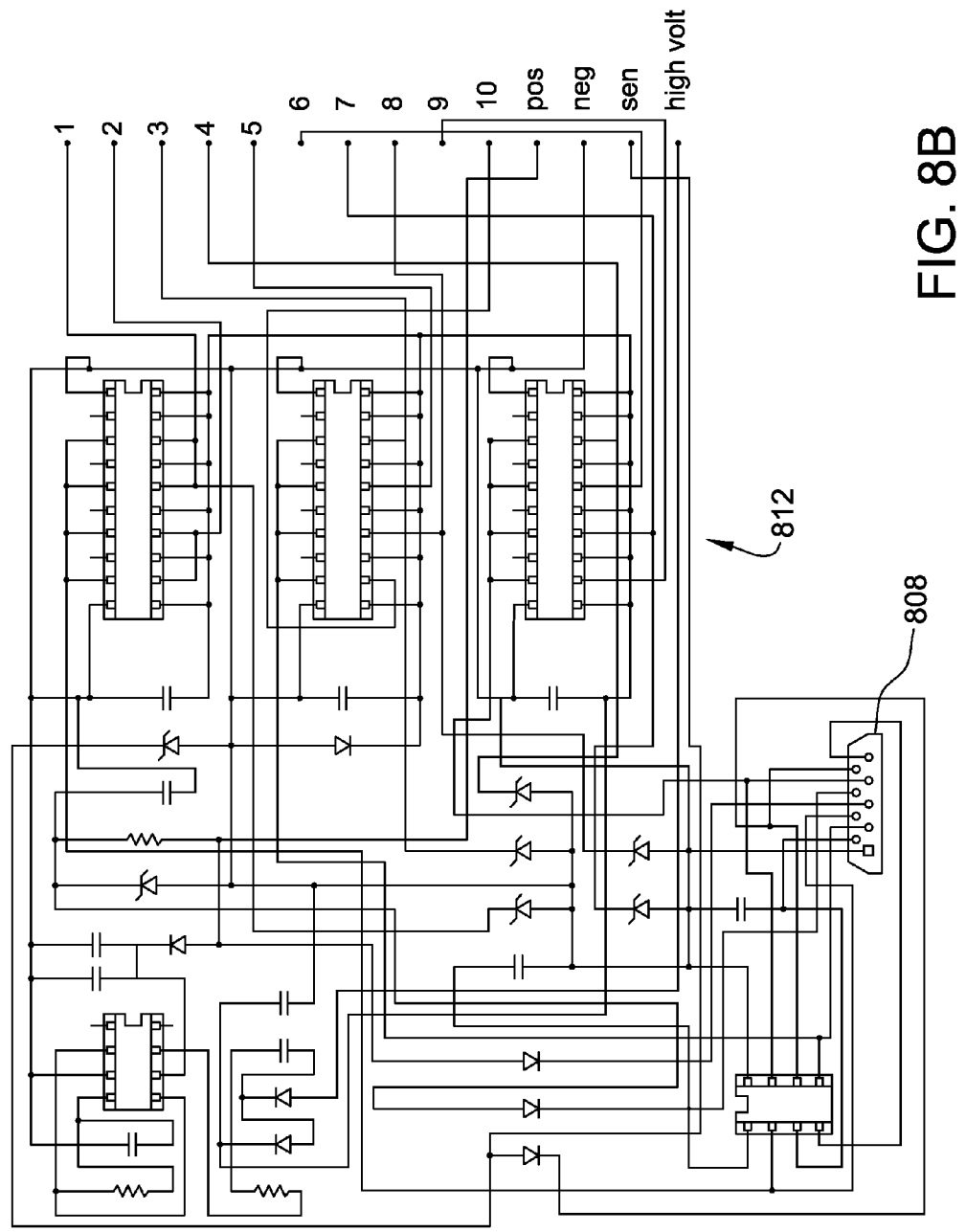

FIGS. 8A and 8B are a circuit diagram of an example energy recycler 801. Energy recycler 801 is an example implementation of energy recycler 601 shown in FIG. 6 and functions in substantially the same manner. Batteries 602 and 604 are coupled to energy recycler 801 via connections 800 and 802 respectively. Energy recycler 801 couples to load 104 via connection 804. Switches (not shown) are connected to connection 806 for turning energy recycler 801 on and off. Controller 402 is coupled to energy recycler 801 via connecter 808 (FIG. 8B). Resonant tank 408 includes a resonant coil (not shown) connected to connection 809. In an exemplary embodiment, load 104 is a motor and energy recycler 801 switches pulses of power to the inductive windings of the motor. Back EMF generated at the end of pulses is resonated and stored in the resonant tank 408 and used to charge batteries 602 and 604.

During operation, a semiconductor and diode network 810 delivers energy from batteries 602 and 604 to power controller 402 and other circuit components when energy recycler 801 is switched on. On startup, the semiconductors M1 and M7 switch on and regulate the voltage for the portion of the energy recycler 801 shown in FIG. 8B. The semiconductors M2 and M4 switch on and make voltage from battery 602 available for a driver circuit 812 (FIG. 8B). Driver circuit 812 provides drive pulses to switches M2, M3, M4, M5, M6, M8, M9, M10, M11, and M12 in response to control signals from controller 402. The controller 402 switches voltage pulses to the drivers that switch M6 and M8 on and off at a frequency set by the user (whether manually, via programming in controller 402, or any other suitable setting), and the controller 402 M10 and M12 on to redirect any back EMF voltages captured and resonated by the resonant coil 408 to battery 604 to charge battery 604. After a predetermined period of time (e.g., one second), switches M2, M4, M10, and M12 are switched off and switches M3 and M5 are turned on to allow battery 604 to provide power to load 406. Switches M9 and M11 are switched on to redirect any back EMF captured and resonated by the resonance coil to battery 602. The cycle continues for the duration of time that is controlled by the frequency setting.

Figure 9A:
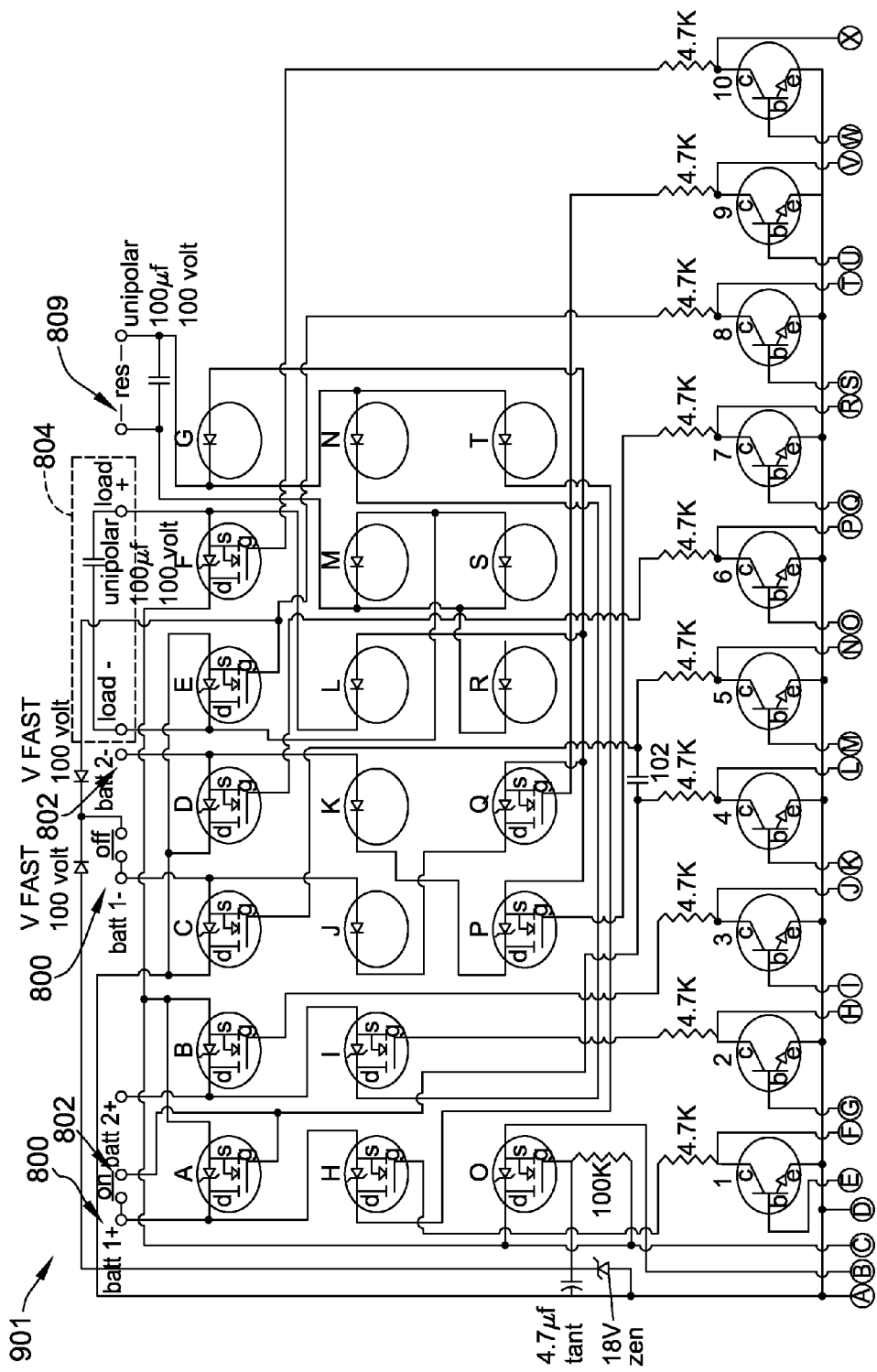
Figure 10:
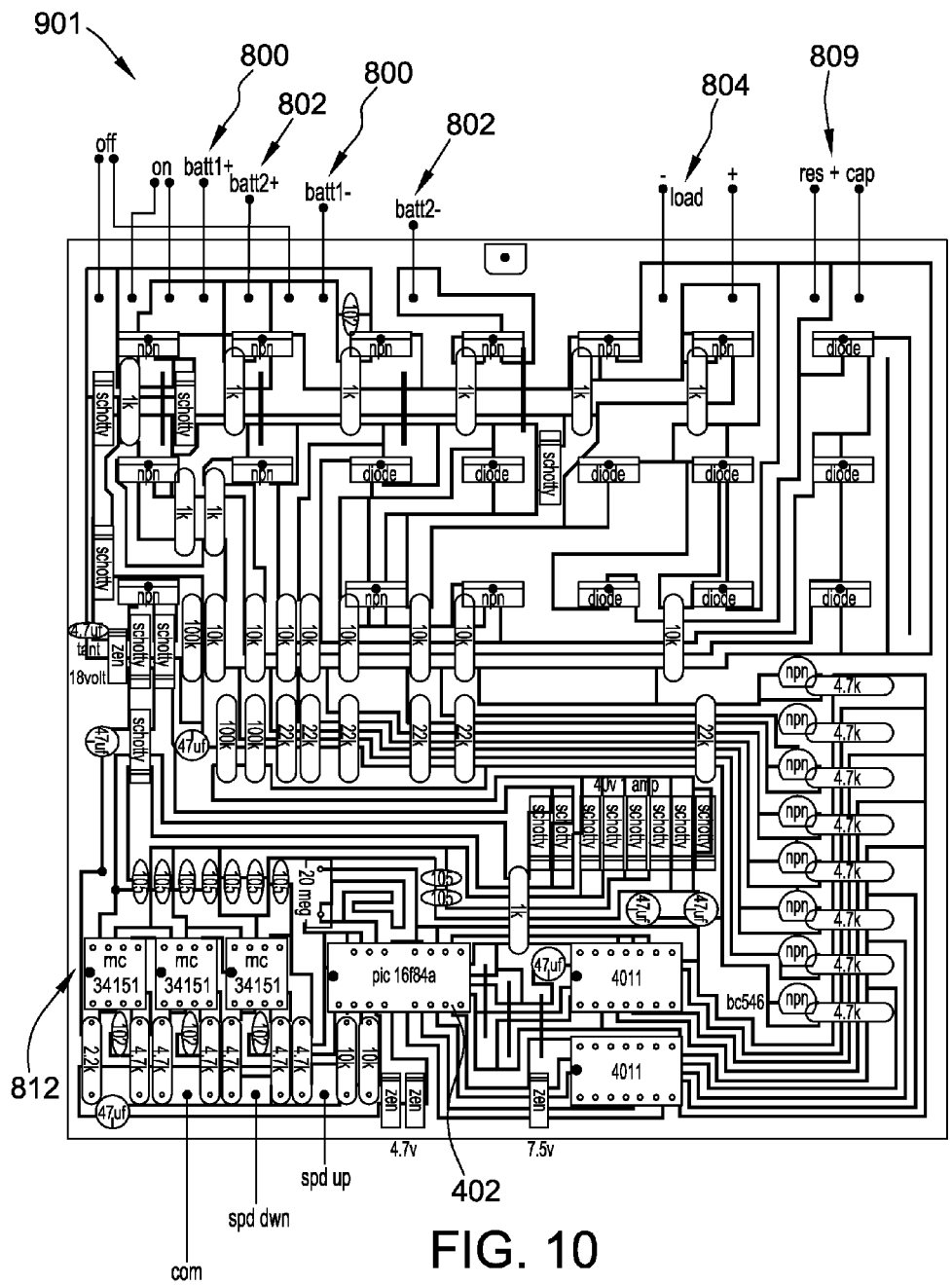
FIG. 10 is a circuit board layout of the energy recycler shown in FIG. 9

FIGS. 9A and 9B are a circuit diagram of another example energy recycler 901. Energy recycler 901 is an example implementation of energy recycler 601 shown in FIG. 6. FIG. 10 is a circuit board layout of energy recycler 901. Energy recycler 901 is similar to the energy recycler 801 and functions in substantially the same manner. Similar components are identified by the same reference numbers.

Figure 11:
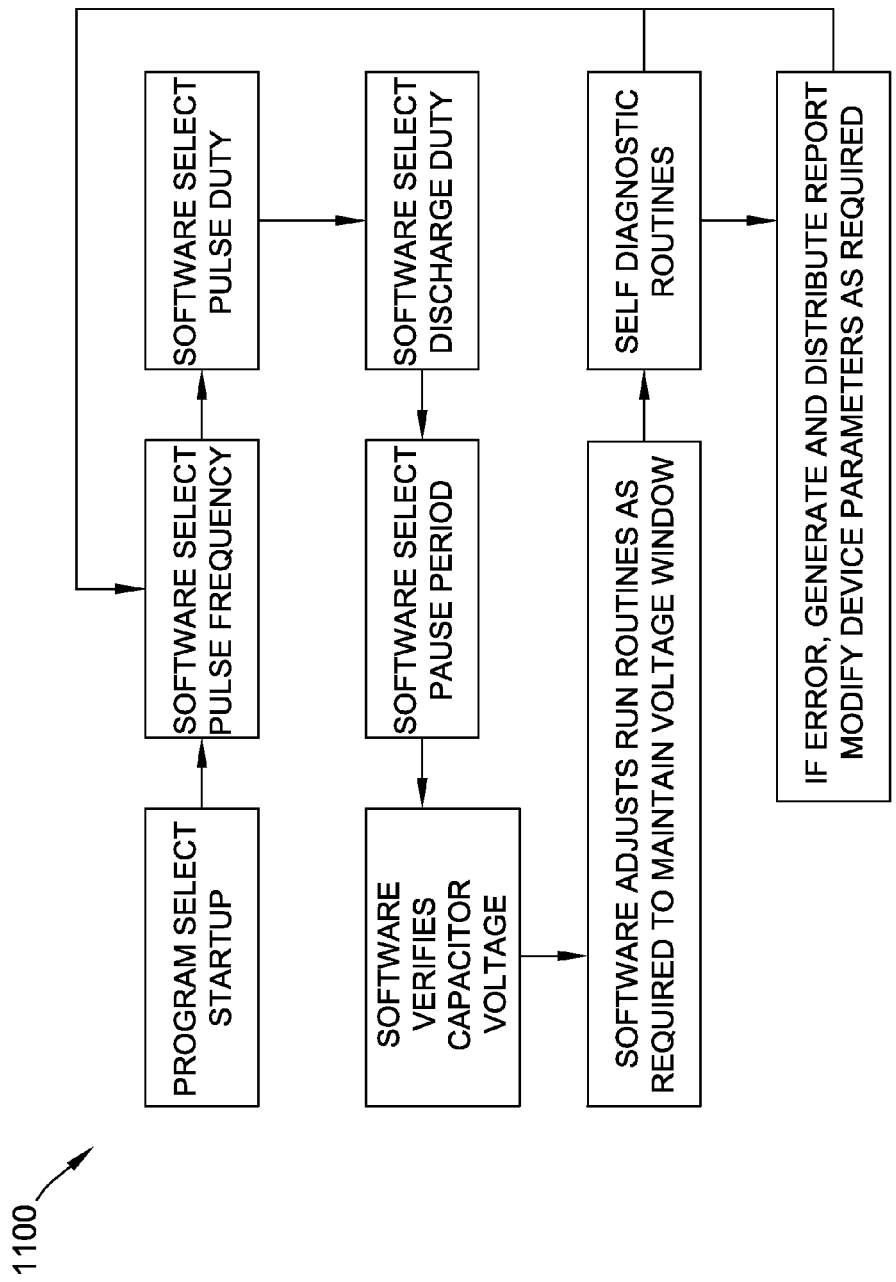
FIG. 11 is a flow diagram of a software implemented method for controlling an energy recycler.

FIG. 11 is a flow diagram of a method 1100 of controlling an energy recycler, such as energy recycler 101, 401, 501, 601, 801, and/or 901, via software executed by a programmable controller 402. When initialized, the software causes controller 402 to set values for the frequency and the duty cycle of pulses. These values may remain fixed for the period of operation, or they may be dynamically altered, e.g., following preset routines, in response to sensor data, etc. After a pulse is delivered into the inductive load 406, the back EMF, or ring-down current, is captured and rectified into resonant tank 408. The software causes controller 402 to provide a pause, or interval, period for the charge to accumulate in the resonant tank before being discharged. The pause period may remain fixed for the period of operation, or may be dynamically altered, e.g., following preset routines, in response to sensor data, etc. The period and duty of the discharge may be varied by controller 402 to maintain a voltage level on resonant tank 408 within a predetermined target range. The duty and frequency of the discharge pulse may be fixed when initialized, or may be actively managed by controller 402 following preset routines, in response to sensor data, etc. The discharge pulse may be skipped, any number of times to substantially optimize the discharge cycle, to increase the voltage within the resonant tank, and/or to meet specific requirements of the target load. From the resonant tank, the accumulated charge may be used to charge a battery, run an electric motor, etc. Controller 402 may dynamically control this process, by varying the duty cycle and/or frequency of the discharge pulse from the resonant tank according to preset routines, in response to sensor data, etc.

In some configurations, it may be desirable to release a pulse back to the source 102, as well as to the load 104. This process may be managed passively or actively, in response to data supplied about the status of the source 102. The properties of the pulse, e.g. the duty cycle and frequency, may also be varied by controller 402 following preset routines, in response to sensor data, and/or in response to specific commands. The software permits operation with multiple loads, multiple outputs, and/or multiple sources. Substantially real time frequency and duty adjustments can be made by the controller to facilitate tuning of the coil, and allowing optimal frequency and duty cycle values to be identified for a particular application and hard written into the registries, as required. When the software is executed by the controller 402, the controller 402 performs error correction. Thus, the software offers, to a certain extent, an ability to correct hardware and repair faults. For example, controller 402 may redirect signals from a malfunctioning PWM pin-set to a functional PWM output pin-set. Controller 402 dynamically monitors and logs for analysis relevant data regarding the normal operation of the energy recycler, so that a known benchmark of operation is established. Controller 402 generates an error report. The error report may be output by any suitable wired or wireless communications in any suitable communications protocol, such as transmission control protocol and internet protocol (TCP/IP), sequenced packet exchange (SPX), etc.

In some embodiments, to minimize power consumption, the controller 402 does not set period and duty cycle values described above using PWM routines. Rather, the software causes controller 402 to adjust the period and duty cycle values through the use of sleep, power-down, and other low-power states, commonly available in modern microcontrollers. These commands can be made to act as a form of pause for the software.

In some embodiments, source 102 is a solar panel, or other suitable, non-battery, power supply. The software includes instructions that, when executed by controller 402, cause controller 402 to manage and regulate the flow of power from source 102 for optimal system performance. For example, controller 402 may operate to achieve operation of the solar panel at its maximum power point. Controller 402 may vary, for example, the frequency, duty cycle, and/or throughput of the system.

Figure 12:
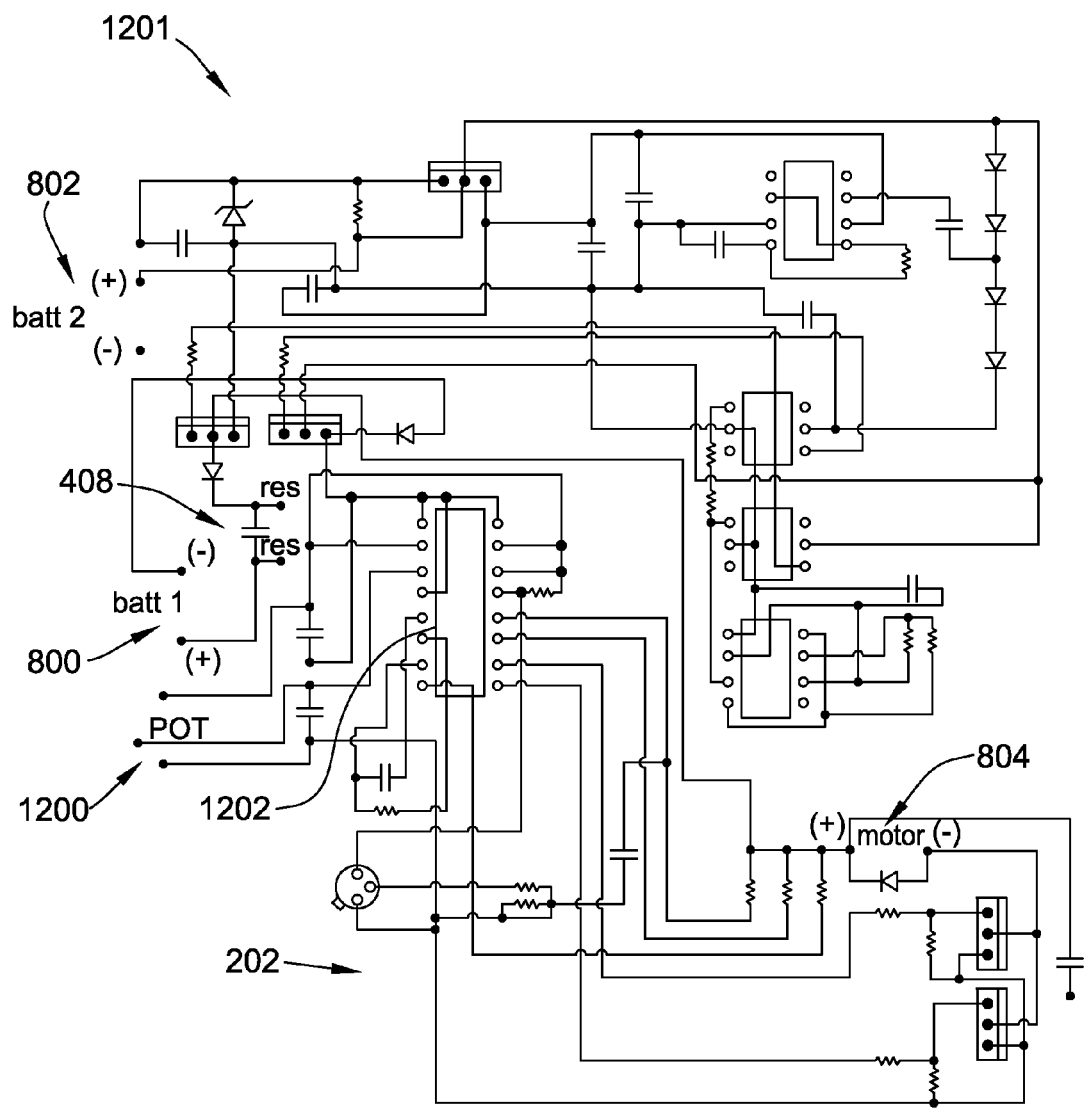
FIG. 12 is a circuit diagram of another energy recycler for use in the system shown in FIG. 6.
Figure 13:
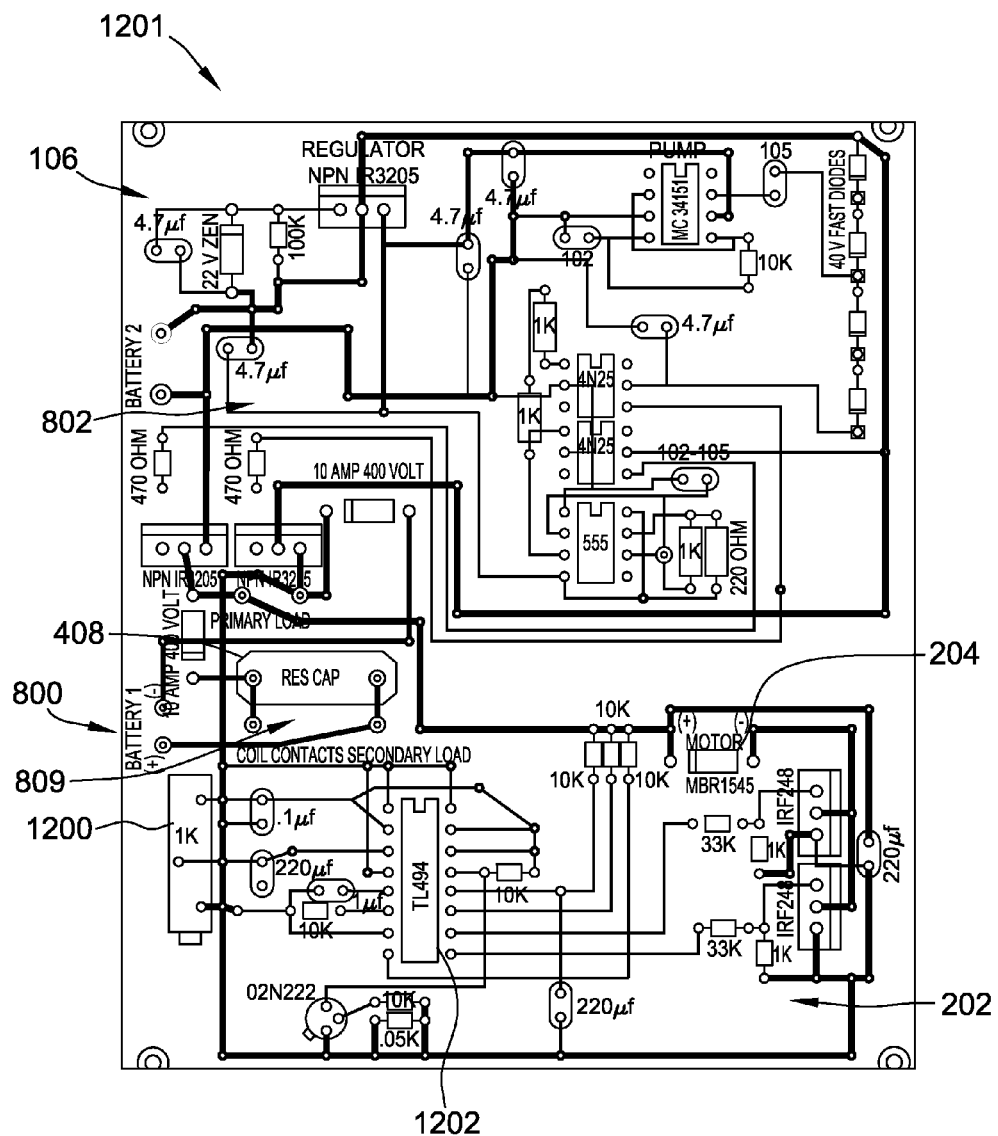
FIG. 13 is a circuit board layout of the energy recycler shown in FIG. 12.

FIG. 12 is a circuit diagram of another example energy recycler 1201. Energy recycler 1201 is an example implementation of energy recycler 601 shown in FIG. 6 and functions in substantially the same manner. FIG. 13 is a circuit board layout of energy recycler 1201. In this embodiment, motor controller 202 is integrated with energy recycler 1201. Batteries 602 and 604 are coupled to energy recycler 106 via connections 800 and 802. Energy recycler 106 couples to motor 204 via connection 804. Resonant tank 408 includes a resonant coil (not shown) connected to connection 809. Motor controller 202 is a pulse width modulation (PWM) control circuit operable to control the speed of motor 204. Energy recycler 1201 does not include a microcontroller or other digital, programmable controller as controller 402. Rather, control of energy recycler 1201 is implemented through analog control circuitry distributed throughout energy recycler 1201. Energy recycler 1201 is designed with a resonant tank 408 generally tailored for a particular load (e.g., for a particular motor). The capacitance and inductance used in the resonant tank 408 are selected to substantially match the resonant frequency of the load 104. A user controls the speed of motor 204 via a variable resistance potentiometer 1200 coupled to a PWM control chip 1202.

Figure 14:
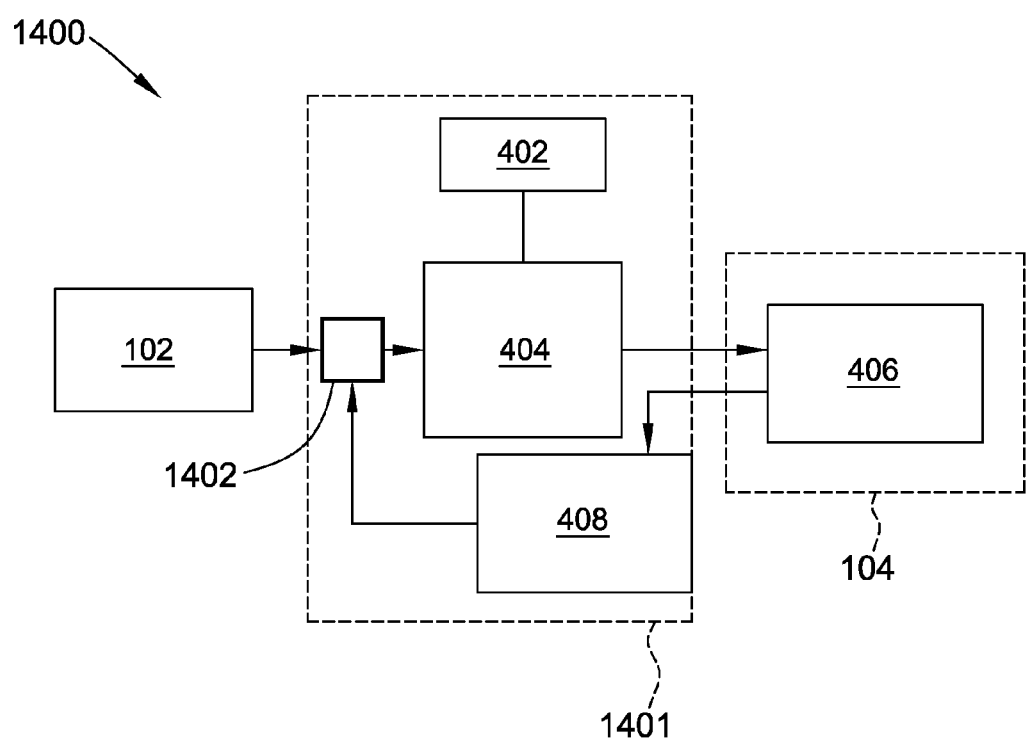
FIG. 14 is a schematic block diagram of an exemplary system including an energy recycler using captured energy to directly power a load.

FIG. 14 is a schematic block diagram of an exemplary system 1400 including electric source 102, load 104, and energy recycler 1401. In the embodiment shown in FIG. 14, inductor 406 is part of load 104, and energy recycler 1401 includes controller 402, switching circuitry 404, and resonant tank 408. Controller 402 controls operation of switching circuitry 404 to selectively apply power from source 102 to inductor 406 as a series of pulses. The induced voltage across the inductor 406 at the end of each pulse of power is coupled to the resonant tank 408. Switch circuit 1402 selectively couples the energy stored in resonant tank 408 to switching circuitry 404 for use in powering load 104. In an exemplary embodiment, switching circuitry 1402 is controlled by controller 402. Alternatively, switching circuitry 1402 is controlled by its own controller, is self-regulated, or is controlled by any other suitable controller. In some embodiments, switching circuitry 1402 is part of switching circuitry 404. The captured energy stored in resonant tank 408 is used to supplement energy from source 102. In some embodiments, the energy stored in resonant tank 408 is delivered to load 104 when energy from source 102 is not being delivered to load 104, such as between pulses of power from source 102.

Figure 15:
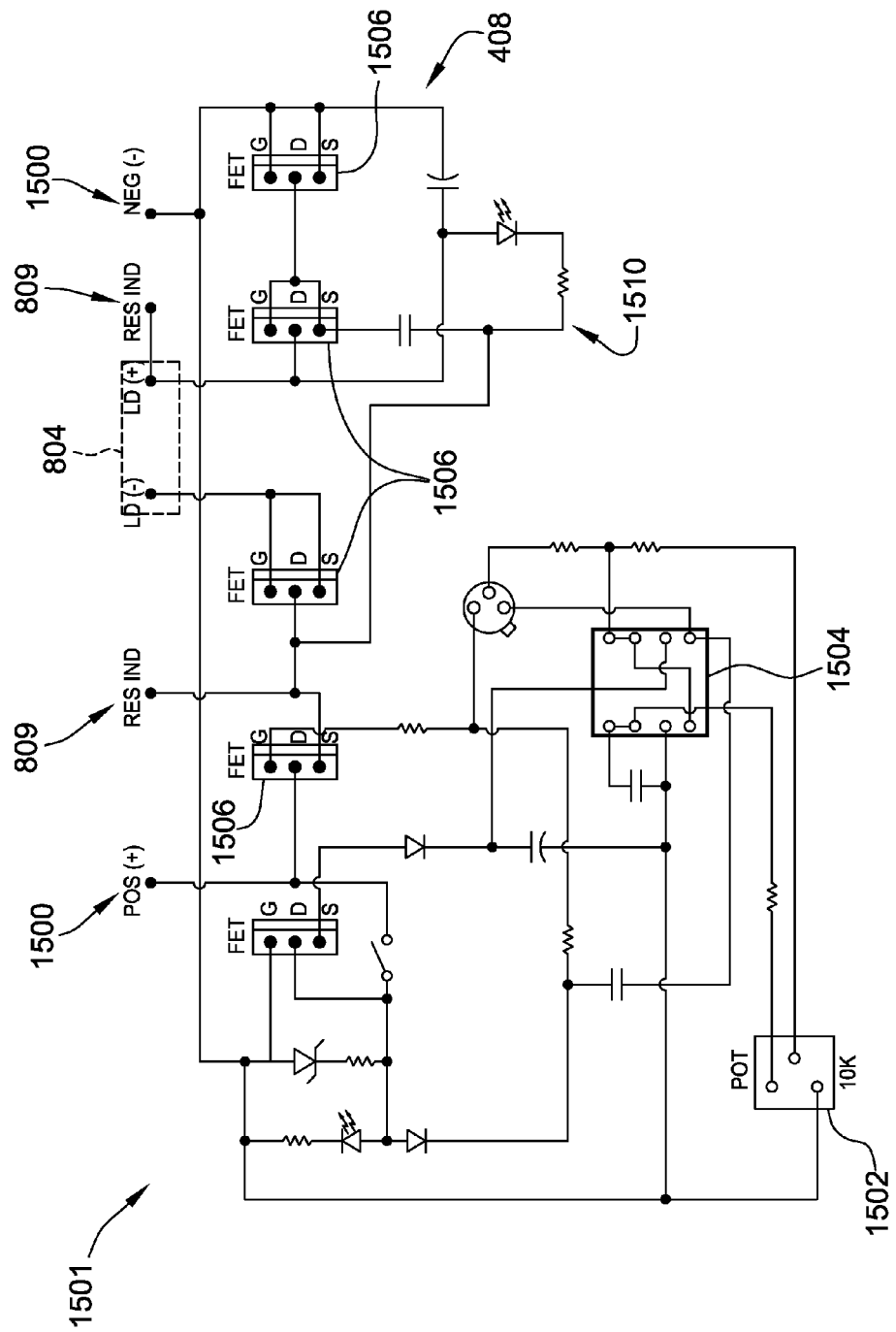
FIG. 15 is a circuit diagram of an energy recycler for use in the system shown in FIG. 14.
Figure 16:
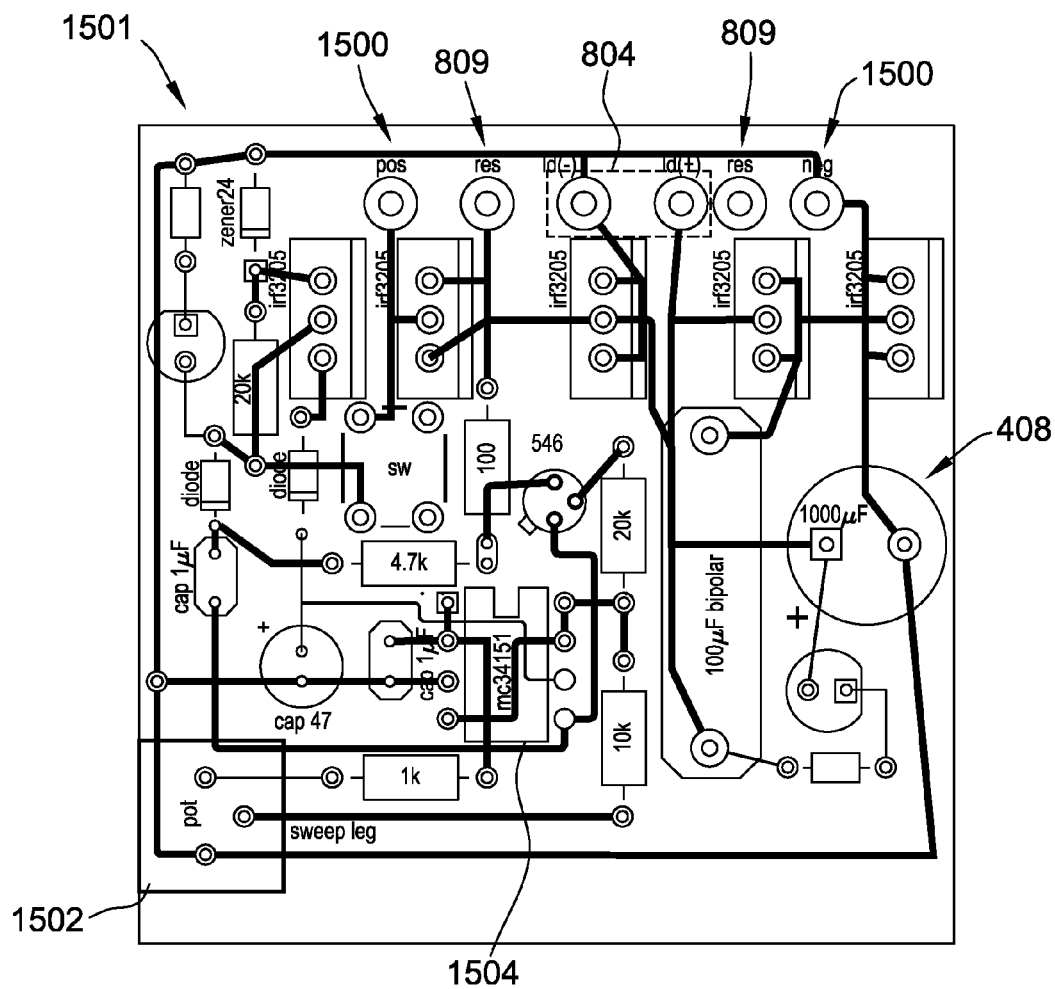
FIG. 16 is a circuit board layout of the energy recycler shown in FIG. 15.

FIG. 15 is a circuit diagram of an example energy recycler 1501 for use in system 1400. Energy recycler 1501 is an example implementation of energy recycler 1401. FIG. 16 is a circuit board layout of energy recycler 1501. Source 102 (not shown) connects to energy recycler 1501 via connections 1500. Energy recycler 1501 couples to load 104 via connection 804. Resonant tank 408 includes a resonant coil (not shown) connected to connection 809. The embodiment of energy recycler 1501 shown in FIGS. 15 and 16 does not include a microcontroller or other digital, programmable controller as controller 402. Rather, control of energy recycler 1501 is implemented through analog control circuitry distributed throughout energy recycler 1501. Energy recycler 1501 is designed with a resonant tank 408 generally tailored for a particular load (e.g., for a particular motor). The capacitance and inductance used in the resonant tank 408 are selected to substantially match the resonant frequency of the load 104. In this embodiment, energy recycler 1501 is further tuned to the resonant frequency of load 104 using a variable resistance potentiometer 1502. By varying the resistance of potentiometer 1502, the switching frequency of switch driver 1504 is varied. Generally, driver 1504 outputs a DC pulse that control the switches 1506 to connect and disconnect the resonant coil of the tank 408 to source 102. The increasing and decreasing voltage on the resonant coil at the beginning and end of the pulse trigger the switches to couple the voltage from the resonant coil to the capacitor of the tank 408. Load 104 receives power through the resonant coil when the coil is coupled to source 102, and receives power from the storage capacitor when the resonant coil is disconnected from the source.

Energy recyclers 1201 and 1501 shown in FIGS. 12, 13, 15, and 16 do not include microcontrollers or other programmable controllers. Accordingly, these embodiments do not require software to operate on a base level. Programmable controllers and software can be used to add functionality, but is not needed to control the process. Moreover, some embodiments use onboard sensors to regulate resonance of the resonant tank circuit. By monitoring ringing in the circuit, the frequency may be varied to improve the efficiency of the energy recycler, resulting in cooler operation, lower losses, and improved system overall performance.

Multiple energy recyclers may be connected together in any of the systems described herein. FIG. 17 is a simplified diagram of a system 1700 including source 102, load 104, and two energy recyclers 1702 and 1704 coupled between source 102 and load 104. In the exemplary embodiment, energy recyclers 1702 and 1704 are both substantially the same as energy recyclers 1501. In other embodiments, any of the energy recyclers 101, 401, 501, 601, 801, 901, 1201, and/or 1401 may be used. Moreover, although only two energy recyclers 1702 and 1704 are shown in FIG. 17, more than two energy recyclers may be so connected. Energy recycler 1702 is connected to source 102, and energy recycler 1704 is connected to load 104. Rather than being connected to source 102, energy recycler 1704 is connected to energy recycler 1704 as a load on energy recycler 1704. Stacking energy recyclers as shown in FIG. 17 may result in increased energy recycling and efficiency, and longer operation of load 104 before battery 102 needs to be recharged or replaced. Moreover, the exemplary systems described herein may be supplemented by photovoltaic, gravity, wind, or other renewable recharging systems to provide further increases in the run time of systems.

Specific implementations of the energy recyclers 101, 401, 501, 601, 801, 901, 1201, and/or 1401 described herein are typically designed for use with a specific load. The energy recyclers 101, 401, 501, 601, 801, 901, 1201, and/or 1401 are tuned for use with a particular load through the selection of the inductor(s) and/or capacitor(s) that make up the resonant tank (e.g., resonant tank 408). The natural resonance of the inductor and/or an inductive load is determined, for example, by pulsing the inductor with a function generator and measuring the ringing of the inductor just after the end of the pulse. The capacitor for the resonant tank is chosen to match the resonant frequency of the inductor. Too large or too small a capacitance may result in unwanted heat an eddy currents.

The square wave pulse train of voltage pulses applied to the inductor and/or the load are also tuned to the resonant frequency of the load and/or inductor. Specifically, the voltage pulses are coupled to the load and/or inductor at about the same frequency as the resonant frequency of the load and/or inductor. In some embodiments, the frequency is tuned using an oscilloscope. While viewing the pulses applied to the load and/or inductor and the voltage on the capacitor, the frequency and/or duty cycle of the pulse train may be adjusted. The desired resonance occurs when the capacitor is fully charged and discharges at the end of each pulse to the inductor/load, thereby extending the pulse. Moreover, at the desired resonance, the capacitor finishes discharging at substantially the same time that a next pulse begins.

The exemplary energy recyclers described herein increase efficiency of systems in which they are incorporated by capturing and productively using energy that would otherwise be wasted. In tests, some embodiments have produced increased run times of a single battery powered system by as much as forty percent. Dual battery systems, in which the captured energy is used to recharge each battery while the other is powering the load, have shown run time increases of over seventy percent. Some embodiments may be able to achieve run time increases of greater than eighty percent over systems without an energy recycler.

Exemplary embodiments of systems and methods including energy recyclers are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the power system as described herein.

The order of execution or performance of the operations in the embodiments are illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of this disclosure.

Although specific features of various embodiments of the may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An energy recycler comprising:
   an input configured to receive an input voltage and couple to a first battery and a second battery;
   an output configured to couple to an inductor;
   a resonant tank;
   a switching circuit coupled between said input, said output, and said resonant tank;
   an analog controller coupled to said switching circuit, said controller configured to:
   control said switching circuit to selectively couple the input voltage to said output;
   couple an induced voltage from the inductor to said resonant tank when the input voltage is decoupled from the inductor;
   selectively couple the first battery to said input to provide the input voltage during a first period of time and selectively couples the second battery to said input to provide the input voltage during a second period of time; and
   selectively couple energy stored in the resonant tank to a load, the load comprising the second battery during the first period of time and the first battery during the second period of time.

2. An energy recycler in accordance with claim 1, wherein said resonant tank comprises a capacitor.

3. An energy recycler in accordance with claim 2, wherein a self-resonant frequency of said capacitor is about the same as a self-resonant frequency of the inductor.

4. An energy recycler in accordance with claim 1, wherein said output is configured to couple to a motor, and wherein the inductor comprises a winding of the motor.

5. An energy recycler in accordance with claim 4, wherein said analog controller is configured to control said switching circuit to selectively couple the input voltage to said output to control operation of the motor.

6. An energy recycler in accordance with claim 1, wherein the load comprises the inductor.

7. An energy recycler in accordance with claim 1, said input is configured to receive the input voltage from at least one battery, and wherein the load comprises the at least one battery.

8. A system comprising:
   an electrical source configured to provide an input voltage, said electrical source comprising a first battery and a second battery;
   a load;
   an energy recycler coupled between said electrical source and said load, said energy recycler comprising:
   an input coupled to said electrical source and configured to receive the input voltage;
   an output coupled to the load;
   a resonant tank;
   a switching circuit coupled between said input, said output, and said resonant tank;
   an analog controller coupled to said switching circuit, said controller configured to:
   control said switching circuit to selectively couple the input voltage to an inductor;
   couple an induced voltage from the inductor to said resonant tank when the input voltage is decoupled from said inductor;
   selectively couple said first battery to said input to provide the input voltage during a first period of time and selectively couple said second battery to said input to provide the input voltage during a second period of time; and
   selectively couple energy stored in the resonant tank to the second battery during the first period of time and selectively couple energy stored in the resonant tank to the first battery during the second period of time.

9. A system in accordance with claim 8, wherein said energy recycler further comprises said inductor coupled between said input and said output.

10. A system in accordance with claim 8, wherein said load comprises said inductor.

11. A system in accordance with claim 10, wherein said load comprises an electric motor, and wherein said inductor comprises at least one winding of said electric motor.

12. A system in accordance with claim 11, wherein said analog controller is configured to control said switching circuit to selectively couple the input voltage to said output to control operation of the motor.

13. A system in accordance with claim 8, wherein said resonant tank comprises a capacitor.

14. A system in accordance with claim 12, wherein a self-resonant frequency of said capacitor is about the same as a self-resonant frequency of the inductor.

15. A system in accordance with claim 8, wherein said analog controller is configured to selectively couple energy stored in the resonant tank to the load.

* * * * *